United States Patent

[11] 3,596,710

[72] Inventor Arthur Neal
 Dayton, Ohio
[21] Appl. No. 885,498
[22] Filed Dec. 16, 1969
[45] Patented Aug. 3, 1971
[73] Assignee John P. Tarlano
 Dayton, Ohio
 a part interest

[54] SELF-DEFROSTING EXTERIOR-TYPE VEHICLE
 MIRROR ASSEMBLY
 1 Claim, 4 Drawing Figs.
[52] U.S. Cl............................................ 165/41,
 165/51, 98/2
[51] Int. Cl........................................ F25b 29/00
[50] Field of Search.............................. 165/17, 41,
 47, 51; 98/2

[56] References Cited
 UNITED STATES PATENTS
1,940,062 12/1933 Schanley...................... 98/2

2,275,622 3/1942 Gatien.......................... 165/41
Primary Examiner—Charles Sukalo
Attorney—John P. Tarlano ABSTRACT: The present invention relates to a self-defrosting exterior-type vehicle mirror assembly which frees the front viewing surface of the mirror therein of ice or snow or a collection of moisture. Two pipes are attached into the back cover of a standard exterior-type vehicle mirror assembly. Vehicle exhaust gas is passed from the high-pressure side of a vehicle muffler through the chamber between the back cover of the standard exterior-type vehicle mirror assembly, and the back nonviewing surface of the mirror therein.
 Heat is transmitted by thermal conductivity to the front-viewing surface of said mirror, to remove frost, ice or moisture which has accumulated thereon. An exit pipe is provided within said back cover of said standard exterior-type vehicle mirror assembly for exiting cooled vehicle exhaust gas from the chamber into the low pressure side of a vehicle muffler.

Patented Aug. 3, 1971

3,596,710

INVENTOR
ARTHUR NEAL

BY John P. Tarlow

HIS ATTORNEY

SELF-DEFROSTING EXTERIOR-TYPE VEHICLE MIRROR ASSEMBLY

BACKGROUND OF THE INVENTION

A defrosting unit is known in the prior art, which has an electric heating coil incorporated into the back nonviewing surface of an exterior-type vehicle mirror assembly. The electrical heating coil allows removal of frost from the front viewing surface of the mirror therein. However, a self-defrosting exterior-type vehicle mirror assembly which has an enclosed chamber between a back cover and the back nonviewing surface of a mirror through which warm vehicle exhaust gas is passed, to defrost the front-viewing surface of the mirror, has not been known.

The self-defrosting exterior-type vehicle mirror assembly of the present invention brings warm vehicle exhaust gas from the vehicle exhaust system into the chamber between the back cover and the back nonviewing surface of the mirror of the self-defrosting exterior-type vehicle mirror assembly. Warm exhaust gas is forced from the high-pressure side of a muffler of a vehicle exhaust system, through a first insulative tube, into the chamber between the back cover and the back nonviewing surface of the mirror of the exterior-type vehicle mirror assembly. The flow of warm vehicle exhaust gas on the back nonviewing surface of the mirror acts to defrost the front viewing surface of the mirror. The vehicle exhaust gas then exits through an exit pipe in the top portion of the back cover of the self-defrosting exterior-type vehicle mirror assembly through a second insulative tube to the low-pressure side of a muffler in a vehicle exhaust system.

The first insulative tube is preferably connected at the bottom of the back cover. The warm vehicle exhaust gas flows into the back cover and exits through the second insulative tube which is near the top of the self-defrosting exterior-type vehicle mirror assembly. The flow of the warm defrosting air through the chamber is thus aided by natural convection of the exhaust gas.

SUMMARY OF THE INVENTION

The present invention relates to a self-defrosting exterior-type vehicle mirror assembly having a back cover and mirror, with a chamber there between an entrance pipe inserted into and near the bottom of said chamber through said back cover for passing warm vehicle exhaust gas into said chamber between said back cover and the back nonviewing surface of said mirror, an exit pipe inserted into and near the top of said chamber through said back cover for allowing cool vehicle exhaust gas to pass out of said enclosed chamber, a first insulative hose connected to said entrance pipe and also to the high-pressure side of a muffler of a vehicle exhaust system for allowing warm vehicle exhaust gas to pass into said chamber to warm and defrost the front viewing surface of said mirror, and a second insulative tube connected to said exit pipe and to the low-pressure side of a muffler of a vehicle exhaust system for allowing cool vehicle exhaust gas to pass out of said chamber after it has warmed and defrosted the front viewing surface of said mirror.

An object of the present invention is to provide a self-defrosting exterior-type vehicle mirror assembly which will clear the front viewing surface of a mirror therein of frost, snow, ice and moisture.

A further object of the present invention is to provide a self-defrosting exterior-type vehicle mirror assembly which will maintain clear visibility.

DESCRIPTION OF THE PREFERRED EMBODIMENT

Figure 1:
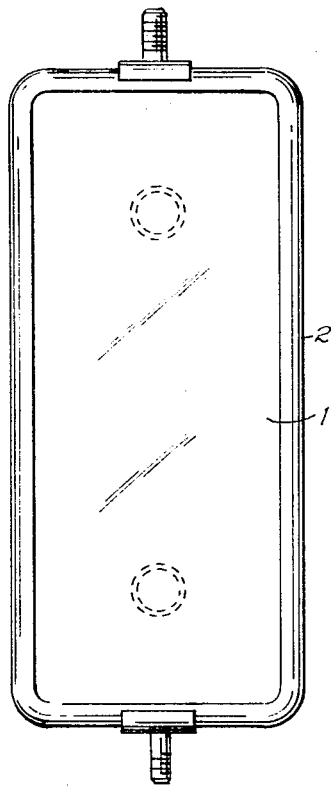
FIG. 1 is a front plan view of the self-defrosting exterior-type vehicle mirror assembly of the present invention.
Figure 2:
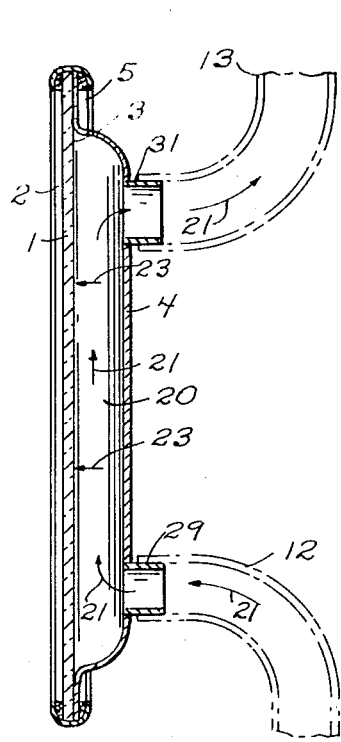
FIG. 2 is a side sectional view of the self-defrosting exterior-type vehicle mirror assembly of the present invention.
Figure 3:
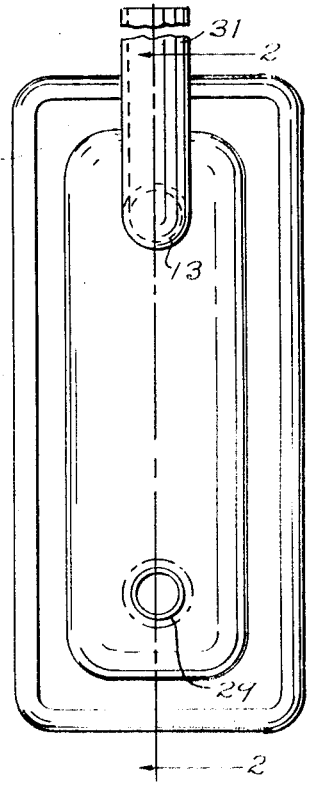
FIG. 3 is a rear plan view of the self-defrosting exterior-type vehicle mirror assembly of the present invention.

FIG. 1 shows the front viewing surface 1 of self-defrosting exterior-type vehicle mirror 2. FIG. 3 shows a back cover 4, such as a metal back cover, connected to the back nonviewing surface 3, of an exterior-type vehicle mirror by means of a clamp 5. An insulative tube 12 is connected into said back cover 4 through an entrance pipe 27 at the base of the back cover 4. Said tube 12 terminates within a chamber 20, between said back cover 4 and the back nonviewing surface of said exterior-type vehicle mirror 2. Heat 23 from said warm exhaust gas 21 warms the back nonviewing surface 3 of said exterior-type vehicle mirror 2 to defrost the front viewing surface 1 of said exterior-type vehicle mirror 2. An insulating layer may be attached to the inner surface of said back cover 4 to further reduce heat loss from said chamber 20 to the outside. The exhaust gas 21 exits chamber 20 through an exit pipe 31 in the top of the backplate 4. An insulative tube 13 conveys the cooled exhaust gas 21 away from the exterior-type vehicle mirror 2.

FIG. 3 shows exit pipe 31 and entrance pipe 29 on back cover 4 in greater detail.

Figure 4:
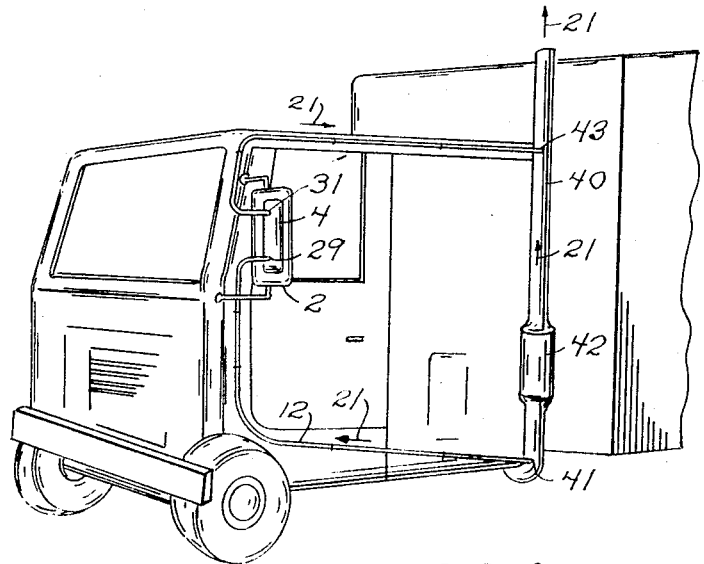
FIG. 4 is a perspective view of the self-defrosting exterior-type vehicle mirror assembly mounted on a vehicle.

As shown in FIG. 4, the insulative tube 12 is connected to the exhaust pipe 40 at a point 41 on the high-pressure side of the sound muffler 42. Due to the resistance of the second muffler 42 to the passage of exhaust gas 21 there through, a portion of the exhaust gas 21 passes through the insulative tube 12 rather than through the exhaust pipe 40. This diverted portion of the exhaust gas 21 passes through mirror 2 and through insulative tube 13 to return to the exhaust pipe 40 at a point 43 on the low-pressure side of the muffler 42.

The diverted portion of the exhaust gas 21 warms the back nonviewing surface 3 of the exterior-type vehicle mirror 2. This heat defrosts the front viewing surface 1 of the exterior-type vehicle mirror 2.

Warm exhaust gas 21 is approximately 250° Fahrenheit as it leaves exhaust pipe 40 at point 41. It is approximately 200° Fahrenheit as it passes through insulative tube 12. Insulative tube 12 allows only minimum loss of heat of the exhaust gas 21 to the outside of insulative tube 12. Said warm exhaust gas 21 enters entrance pipe 29 in back cover 4. Said warm exhaust gas 21 raises by natural convection, upward within chamber 20. As said warm exhaust gas 21 raises through chamber 20, it warms the back nonviewing surface 3 of the exterior-type vehicle mirror 2, to a temperature of approximately 80° Fahrenheit.

The exhaust gas 21 exits chamber 20 through exit pipe 31. The temperature of the back nonviewing surface 3 of exterior-type vehicle mirror 2 is maintained at a temperature of approximately 80° Fahrenheit, and the front viewing surface 1 of said exterior-type vehicle mirror 2 is maintained at a temperature of approximately 70° Fahrenheit. The front viewing surface 1 is therefore defrosted of snow or ice to allow it to better serve as a reflective viewing surface.

A driver of the truck or tractor may view traffic to the rear, and on both sides, of a tractor and trailer rig or in a straight body truck, even during severe freezing and snow storms, without having to stop the vehicle to wipe the mirror 2 clear of moisture, due to the continual applying of heat 23 to the back nonviewing surface 3 of the exterior-type vehicle mirror 2.

What I claim is:

1. In a self-defrosting exterior-type vehicle mirror assembly having a back cover, and mirror, with a chamber there between said assembly being mounted in a vehicle, comprising:
   a. An entrance pipe inserted into said chamber through said back cover for passing warm vehicle exhaust gas into said chamber between said back cover and the back nonviewing surface of said mirror;
   b. An exit pipe inserted into said chamber through said back cover for allowing cool vehicle exhaust gas to pass out of said enclosed chamber, after said exhaust gas has defrosted the front viewing surface of said self-defrosting exterior-type vehicle mirror assembly;

c. A first insulative tube connected to said entrance pipe and also to the high-pressure side of a muffler in the exhaust system of said vehicle for allowing warm vehicle exhaust to pass into said chamber to warm and defrost the front viewing surface of said mirror; and d. A second insulative tube connected to said exit pipe and also to the low-pressure side of a muffler in the exhaust system of the vehicle for allowing cool vehicle exhaust to pass out of said chamber after having warmed and defrosted the front viewing surface of said mirror.